Sept. 5, 1967     N. J. TAYLOR     3,339,716
PACKAGING OF LIQUIDS
Filed Aug. 19, 1965

United States Patent Office 3,339,716
Patented Sept. 5, 1967

3,339,716
PACKAGING OF LIQUIDS
Neil James Taylor, Dunmow, England, assignor to E. M. Cromwell and Company Limited, Hertfordshire, England, a British company
Filed Aug. 19, 1965, Ser. No. 481,136
6 Claims. (Cl. 206—47)

This invention relates to the packaging of liquids and, in particular to the packaging of liquids which are intended to be mixed with one another, in multiple-compartment (including two-compartment) sachets.

The production of liquid-filled sachets from weldable thermoplastic film or foil material (hereinafter referred to broadly as thermoplastic film) is of course very well known and is readily accomplished by using a tube of thermoplastic film which may be made by extrusion or by the longitudinal welding of thermoplastic film. Where a multiple compartment sachet has been required, such that the contents of the two or more compartments may be kept separate but may be mixed together at the time of use without first having to remove the contents from the sachet, it has been necessary to resort to a more complicated type of construction. In general, this has involved the use of an internal rupturable seal separating the two compartments from one another.

It is an object of the present invention to enable a multiple-compartment sachet to be made and filled using a comparatively simple form of tubing made of thermoplastic film without requiring rupturable internal seals.

Broadly, the invention consists in a multiple compartment sachet in the form of a sealed envelope of thermoplastic film sub-divided by welds to comprise two individual compartments communicating with one another by way of a relatively narrow tube-like portion or neck disposed so that by folding the envelope along a line between said compartments, the respective neck is folded transversely, with the individual compartments containing respective liquids intended to be admixed with one another when but not until the sachet contents are to be used.

It goes without saying, of course, that the entire sachet should not be turgid, that is to say it should not be filled to capacity, otherwise at the time of use it will not be possible to force the contents of one compartment into an adjacent compartment for mixing purposes.

It has been discovered that if the liquid contents of two compartments of a sachet are connected together by a tube defined in the sachet per se by weld lines, and if this tube is folded transversely, admixing of the contents of the compartments is sufficiently prevented for practical purposes. The precise width of the tube in relation to the width of the compartments cannot very well be specified for all possible applications of the invention, but a suitable width can readily be found by a few routine tests. To some extent the most sutiable width depends upon the viscosity of the liquids concerned. In general, if the neck or tube is made not much larger than the minimum which appears suitable for conveying the contents from one compartment to another in the course of mixing these contents, a fully adequate seal will be obtained when the neck is folded. The neck can however in many cases be made appreciably larger than this, while remaining narrower than, say, half or more preferably, one third of the width of the respective compartments.

According to a further feature of the invention, the fold across the neck is retained by a weld or welds made at or adjacent to the neck while the latter is folded. The sachet may have a generally rectangular form, the individual compartments being defined by a weld or welds extending from one edge towards the opposite edge without completely traversing the envelope, that is to say, in each case leaving a small gap. A neck may then be defined by a continuation of the aforesaid weld or welds extending between the respective gaps, with only one weld being required if the gap is at one edge of the envelope while two are required if the gap is at an intermediate position transversely of the envelope. In either case, an area of the envelope will in this way be cut off from all communication with the adjoining compartments, and this area as well as the neck itself will be folded when the envelope or sached is folded as explained above. According to the preferred form of the invention, the fold may be retained by a weld or welds in this folded area, preferably at the edge of the neck. As an alternative, the fold in this area may be retained by other means such as for example, by staples, clips, adhesive or the like.

To facilitate the unfolding of the sachet, the welds defining the neck and adjacent ends of the compartments may be of the semi-cut-weld form, that is, of the kind in which the weld margin is almost but not fully severed. Alternatively the fold-retaining weld may be of this type.

The forms of sachet described above may be filled simply by leaving the end walls or a side wall open, filling the respective compartments with the required quantities of the respective liquids, and then completing the welding.

One important use of a sachet in accordance with the invention is the provision of a liquid synthetic resin cement such as an epoxy resin cement in which at least one of the ingredients required in setting of the cement must be kept separate in a respective compartment so that the resin can be catalysed or activated immediately before use. The compartment containing the activator or catalyst may be considerably smaller than the compartment containing the resin per se in which case of course the neck portion will be disposed towards one end of the sachet. The amount of liquid in each compartment will be restricted so that the whole of the smaller compartment can be expelled into the larger one (where the compartments are of different size) without distending the one compartment so much that manipulation of the contents becomes impossible.

It is a valuable feature of the present invention that a three-compartment sachet of compact form can be made simply by making an additional weld in what would otherwise have been a two-compartment sachet as described above, with the weld dividing one of such two compartments longitudinally and extending into the neck, preferably beyond the fold line. Where the sachet as a whole is smaller at a first end of the neck than at the other end, the smaller end should be the divided one. If desired, two longitudinal welds could be used to divide the compartment into three.

The invention will be described further with reference to the accompanying drawings, of which:

Figure 1:
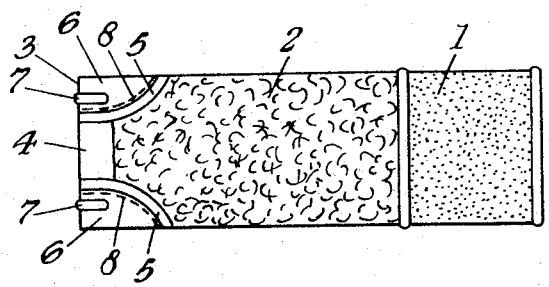
FIGURE 1 is a view of one construction of a filled two-compartment sachet.
Figure 3:
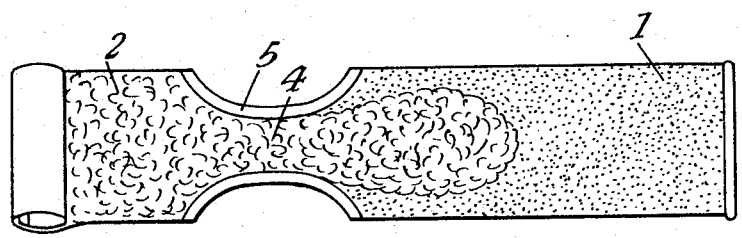
FIGURE 3 shows the sachet of FIGURE 1 or FIGURE 2 in use, at the stage of mixing the contents of the two compartments.

The sachet shown in FIGURE 1 comprises a first compartment 1 and a second compartment 2 which, in the position illustrated, overlies the compartment 1. These compartments represent sections of a single length of lay-flat tubing which is folded over at 3 which is approximately the transverse center line of a reduced neck 4 leading from the one compartment to the other. This neck is defined by a pair of arcuate or bridge-shaped welds 5 sealing the opposed faces of the lay-flat tubing together and thus excluding from the compartments 1 and 2 a pair of marginal areas or ears 6 of the tubing. A pair of welds 7 formed in these folded areas 6 retains the fold 3 and it is found that the retention of this fold effectively serves in the course of normal handling or even under the influence of quite appreciable pressure to prevent the contents of compartments 1 and 2 from penetrating as far in the neck 4 as the fold line 3. When the two materials in the compartments 1 and 2 are to be mixed, the folded areas 6 are cut away such as by using a pair of scissors along the dotted lines 8, thus cutting off the welds 7 and enabling the sachet as a whole to be opened out flat. Alternatively, the weld 5 may be a semi-cut-weld in which the dotted line 8 then represents the substantially perforated, or tear-away margin of the weld. By squeezing or rolling up the compartments 2 as shown in FIGURE 3, its contents can not be expelled into compartment 1 through the neck 4. It will be seen that the compartment 2 is smaller than the compartment 1, but this is not an essential feature of the invention. The process of expelling the liquid contents from one compartment to the other can be continued until a thoroughly efficient mixing has been achieved. The contents of the smaller compartment (in the case of compartments of unequal size) can then be expelled fully into the other compartment, and the neck 4 severed. The mixed contents can then be discharged through the thus severed neck.

Figure 2:
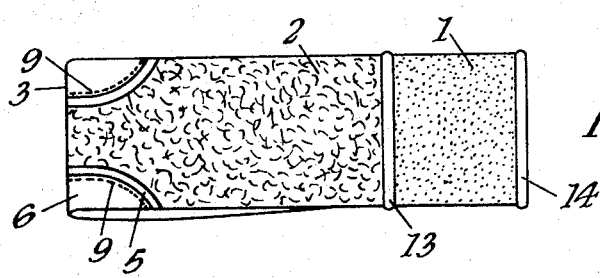
FIGURE 2 is a similar view showing a slightly different construction.

The construction illustrated in FIGURE 2 is modified as regards the manner in which the welding of the area 6 in the folded position is achieved. In this construction, instead of the welds 7, tear welds 9 are made conforming closely with the welds 5 but lying in the folded areas or ears 6. When the pack is to be used, all that is required is to tear off the "ears" 6 and then the sachet can be opened out for mixing the contents as already described.

Figure 4:
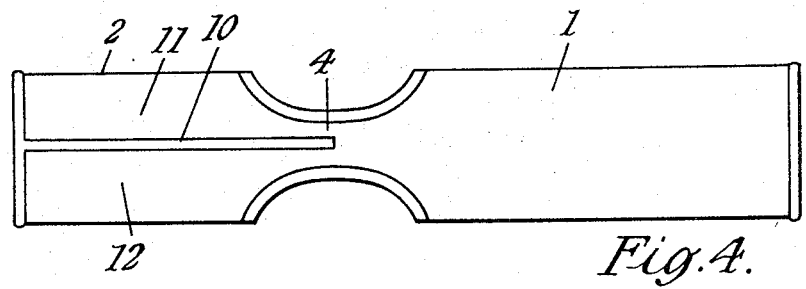
FIGURE 4 shows a filled three-compartment sachet immediately before the mixing operation.

FIGURE 4 shows an unfolded sachet, that is to say, one from which the "ears" 6 have been cut or torn away, to exhibit an additional weld 10. This weld 10 divides the compartment 2 into separate, side by side, compartments 11 and 12 opening separately into the neck 4. The weld line 10 projects just beyond the location of the fold line 3, that is to say, it is long enough to enable the sachet to be folded with the weld 10 extending beyond the fold into the neck region. This prevents the contents of the compartments 11 and 12 from commingling with one another while enabling such contents to be expelled simultaneously into the compartment 1 when mixing is performed as described above.

In all cases, the sachets may be filled from the open extremities while keeping the neck 4 closed by means of a clip or the like, and the extremities subsequently are welded as at 13, 14.

The invention is not to be confined to any strict conformity to the showings in the drawings but changes or modifications may be made therein so long as such changes or modifications mark no material departure from the spirit and scope of the appended claims.

I claim:
1. A multiple compartment sachet comprising a sealed elongated envelope of thermoplastic film having side and end edges having a first portion thereof folded over at least a part of the remaining portion along a transverse line so as to define two individual compartments each containing a liquid and welds located inwardly of the side edges of the envelope in the area of the transverse line forming a relatively narrow neck portion providing liquid communication between the compartments when the thermoplastic film between the welds and side edges of the envelope is removed so that such liquids are mixed.

2. A multiple compartment sachet as claimed in claim 1 wherein the width of the neck portion is approximately one-third the width of the individual compartments.

3. The multi-compartment sachet as claimed in claim 1 including a further weld for the film between the first-mentioned welds and the side edges of the envelope for maintaining the fold between the two individual compartments.

4. The multi-compartment sachet as claimed in claim 1 in which said welds are semi-cut permitting the film between the welds and edges of the envelope to be readily removed.

5. The multi-compartment sachet as claimed in claim 1 including a further weld extending longitudinally of said first portion at least as far as the fold in the neck portion for defining at least two compartments in said portion.

6. The multi-compartment sachet as claimed in claim 1 in which one compartment contains an epoxy resin and the other a hardener medium.

References Cited

UNITED STATES PATENTS

| | | |
|---|---|---|
| 1,602,531 | 10/1926 | Itoh _____ 206—47 |
| 2,015,972 | 10/1935 | Sodergren. |
| 2,663,298 | 12/1953 | Rose. |
| 2,800,269 | 7/1953 | Smith _____ 206—47 X |
| 3,028,000 | 4/1962 | Clements et al. _____ 206—47 |
| 3,036,894 | 5/1962 | Forestiere _____ 206—47 |

FOREIGN PATENTS 711,186  6/1954  Great Britain.

LOUIS G. MANCENE, *Primary Examiner.*